(12) United States Patent
Deng et al.

(10) Patent No.: US 11,267,427 B1
(45) Date of Patent: Mar. 8, 2022

(54) SIDE AIRBAG ASSEMBLY

(71) Applicant: Ford Global Technologies, LLC, Dearborn, MI (US)

(72) Inventors: Zhibing Deng, Northville, MI (US); Joseph E. Abramczyk, Farmington Hills, MI (US); Deepak Patel, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/169,855

(22) Filed: Feb. 8, 2021

(51) Int. Cl.
| | |
|---|---|
| *B60R 21/207* | (2006.01) |
| *B60R 21/2338* | (2011.01) |
| *B60R 21/231* | (2011.01) |
| *B60R 21/263* | (2011.01) |

(52) U.S. Cl.
CPC ........ *B60R 21/207* (2013.01); *B60R 21/2338* (2013.01); *B60R 2021/23146* (2013.01); *B60R 2021/23161* (2013.01); *B60R 2021/23386* (2013.01); *B60R 2021/2633* (2013.01)

(58) Field of Classification Search
CPC .............. B60R 21/207; B60R 21/2338; B60R 2021/23146; B60R 2021/23161; B60R 2021/23386; B60R 2021/2633
See application file for complete search history.

(56) References Cited

U.S. PATENT DOCUMENTS

| | | | |
|---|---|---|---|
| 10,099,645 B2 | 10/2018 | Song et al. | |
| 10,300,878 B2 | 5/2019 | Park et al. | |
| 10,703,321 B2 * | 7/2020 | Deng | ............... B60R 21/233 |
| 2017/0158160 A1 * | 6/2017 | Sugimori | .............. B60R 21/264 |
| 2018/0118150 A1 * | 5/2018 | Kwon | ................... B60R 21/207 |
| 2019/0092271 A1 | 3/2019 | Park et al. | |
| 2019/0283700 A1 * | 9/2019 | Kwon | ................. B60R 21/2338 |
| 2020/0017055 A1 * | 1/2020 | Deng | ................... B60R 21/207 |
| 2020/0047705 A1 * | 2/2020 | Moon | ................... B60R 21/237 |
| 2020/0062212 A1 * | 2/2020 | Markusic | .............. B60R 21/207 |
| 2020/0317155 A1 * | 10/2020 | Deng | ................... B60R 21/233 |
| 2021/0213903 A1 * | 7/2021 | Deng | ................ B60R 21/23138 |

FOREIGN PATENT DOCUMENTS

| | | | | |
|---|---|---|---|---|
| DE | 102019113041 A1 * | 11/2020 | ....... | B60R 21/23138 |
| KR | 20210000910 A * | 1/2021 | ....... | B60R 21/23138 |

* cited by examiner

*Primary Examiner* — Drew J Brown
(74) *Attorney, Agent, or Firm* — Frank A. MacKenzie; Bejin Bieneman PLC

(57) ABSTRACT

A restraint system includes a first seat and a second seat spaced from each other along a cross-vehicle axis. An airbag is supported by the first seat and is inflatable towards the second seat. The airbag includes an upper portion having a top surface and a lower portion having a bottom surface facing in an opposite direction than the top surface. An external tether is releasably engaged with the first seat. The external tether is connected to the top surface and the bottom surface.

20 Claims, 8 Drawing Sheets

SIDE AIRBAG ASSEMBLY

BACKGROUND

A side airbag is mounted to a seatback and is inflatable along a side of an occupant, specifically along the torso and/or hip of the occupant. The side airbag, for example, may be inflatable between the occupant and a center console. The side airbag controls the kinematics of the occupant in vehicle impacts that urge the occupant in a cross-vehicle direction, e.g., a side impact.

DETAILED DESCRIPTION

Figure 1:
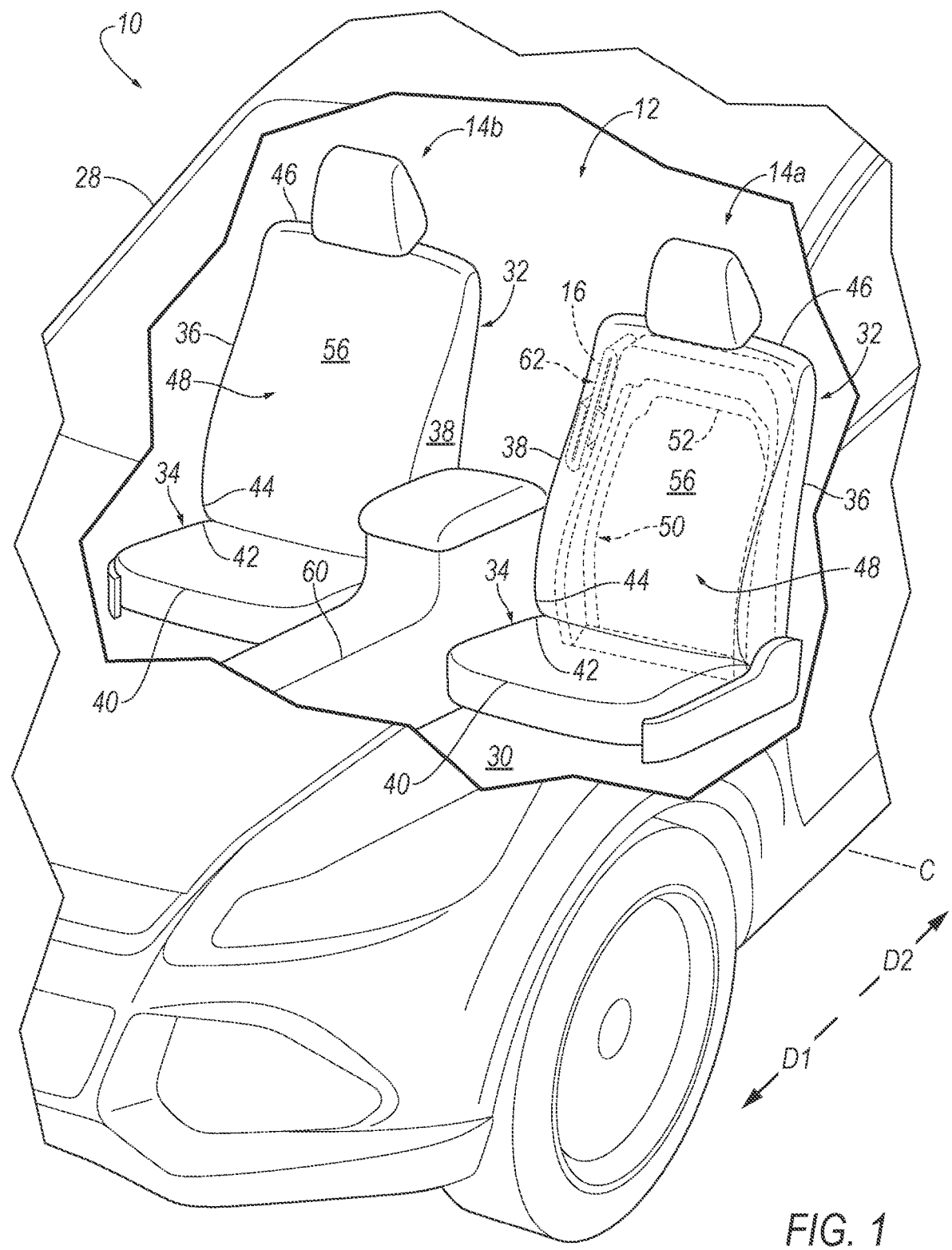
FIG. 1 is a perspective view of an airbag in an uninflated position.

A restraint system includes a first seat and a second seat spaced from each other along a cross-vehicle axis. An airbag is supported by the first seat and is inflatable towards the second seat. The airbag includes an upper portion having a top surface and a lower portion having a bottom surface facing in an opposite direction than the top surface. An external tether is releasably engaged with the first seat. The external tether is connected to the top surface and the bottom surface.

The airbag may include an intermediate portion extending from the upper portion to the lower portion. The intermediate portion may be fixed relative to the first seat.

The restraint system may include an airbag housing fixed to the first seat. The intermediate portion may be fixed to the airbag housing from the lower portion to the upper portion.

The restraint system may include an inflator in fluid communication with the airbag. The inflator may be supported by the airbag housing.

The restraint system may include a release mechanism configured to release the external tether. The release mechanism may be supported by the airbag housing.

The upper portion and the lower portion, in the inflated position, may be on opposite sides of the intermediate portion when the external tether is in an unreleased position.

The first seat may define an occupant seating area. The upper portion, in an inflated position, may extend into the occupant seating area when the external tether is in an unreleased position.

The lower portion, in an inflated position, may extend to the second seat when the external tether is in an unreleased position.

The upper and lower portions, in the inflated position, may be offset with each other relative to the cross-vehicle axis when the external tether is in an unreleased position.

The upper and lower portions, in the inflated position, may be generally aligned with each other relative to the cross-vehicle axis when the external tether is in a released position.

The restraint system may include a center console disposed between the first and second seats. The lower portion in the inflated position may be disposed between the center console and the upper portion.

The external tether may extend around the airbag when the external tether is in an unreleased position.

The external tether may extend about an axis transverse to the cross-vehicle axis when the external tether is in an unreleased position.

The restraint system may include a release mechanism supported by the first seat. The release mechanism may be a cutter configured to release the external tether.

The restraint system may include a release mechanism supported by the first seat. The release mechanism may be a release pin configured to release the external tether.

The external tether may be under tension when the external tether is in an unreleased position and the airbag is in the inflated position.

The external tether may be fabric.

The external tether may be uninflatable.

The restraint system may include a computer including a processor and a memory. The memory storing instructions executable by the processor to release the external tether based on detecting that the first and second seats are occupied.

The instructions may further include instructions to prevent releasing the external tether based on detecting that the second seat is unoccupied.

With reference to the Figures, wherein like numerals indicate like parts throughout the several views, a vehicle 10 is generally shown. The vehicle 10 includes a restraint system 12. The restraint system 12 includes a first seat 14a and a second seat 14b spaced from each other along a cross-vehicle axis C. An airbag 16 is supported by the first seat 14a and is inflatable towards the second seat 14b. The airbag 16 includes an upper portion 18 having a top surface 20 and a lower portion 22 having a bottom surface 24 facing in an opposite direction than the top surface 20. An external tether 26 is releasably engaged with the first seat 14a. The external tether 26 is connected to the top surface 20 and the bottom surface 24.

Figure 2:
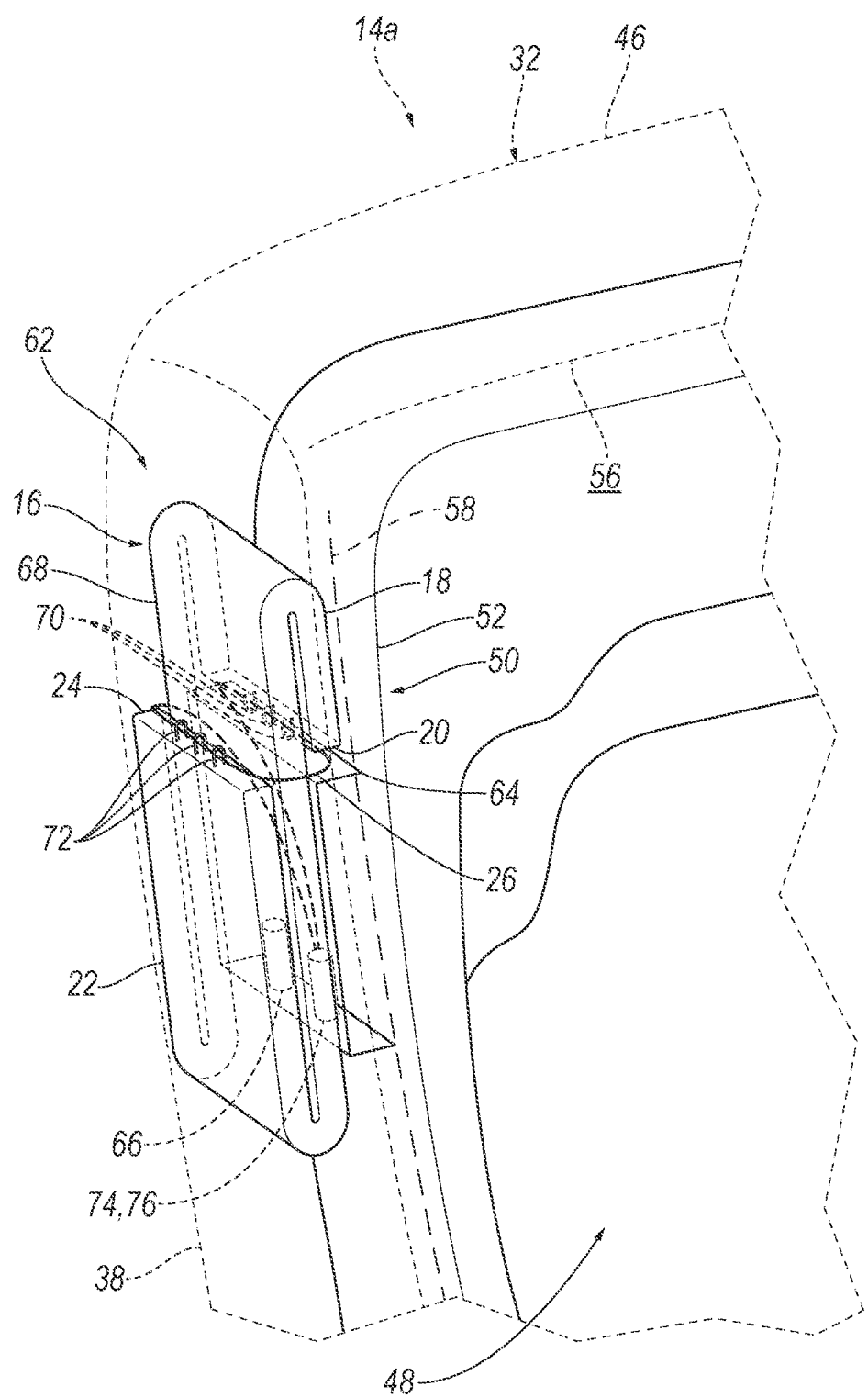
FIG. 2 is a magnified view of the airbag in the uninflated position.

During a vehicle impact, the airbag 16 may be inflated from an uninflated position, as shown in FIGS. 1-2, to an inflated position, as shown in FIGS. 3A-4B. During the vehicle impact, an occupant of the first seat 14a may be forced into the airbag 16 in the inflated position. The airbag 16 may provide coverage so as to control the kinematics of the occupant, e.g., a head of the occupant. During offset and oblique impacts, e.g., frontal offset impacts, far side oblique impacts, near side oblique impacts, etc., the occupant is urged at an angle relative to vehicle-forward. During these types of impacts, the head of the occupant may impact the upper portion 18 of the airbag 16. Specifically, the external tether 26 is connected to the top surface 20 of the upper portion 18 and the bottom surface 24 of the lower portion 22, which may allow the external tether 26 to control the shape of the airbag 16 during inflation such that the top surface 20 in the inflated position is disposed adjacent to the head of the occupant in the first seat 14a. By controlling the shape of the airbag 16 during inflation, the external tether 26 may increase the likelihood that the airbag 16 provides coverage to control the kinematics of the occupant during offset and oblique impacts.

With reference to FIG. 1, the vehicle 10 may be any type of passenger or commercial automobile such as a car, a truck, a sport utility vehicle, a crossover, a van, a minivan, a taxi, a bus, etc. The vehicle 10, for example, may be an autonomous vehicle. In other words, the vehicle 10 may be autonomously operated such that the vehicle 10 may be driven without constant attention from a driver, i.e., the vehicle 10 may be self-driving without human input.

With reference to FIG. 1, the vehicle 10 may include a body 28 defining a passenger cabin (not numbered) to house occupants, if any, of the vehicle 10. The body 28 may include a roof (not numbered) and a floor 30 with the roof defining an upper boundary of the passenger cabin and the floor 30 defining a lower boundary of the passenger cabin. The body 28 includes doors openable to allow ingress to and egress from the passenger cabin.

The passenger cabin may extend across the vehicle 10, i.e., from one side to the other side of the vehicle 10. The passenger cabin includes a front end (not numbered) and a rear end (not numbered) with the front end being in front of the rear end during forward movement of the vehicle 10. The passenger cabin includes one or more seats 14. The seats 14 may be arranged in any suitable arrangement. For example, one or more of the seats 14 may be at the front end of the passenger cabin, i.e., a front seat, and/or one or more of the seats 14 may be at the rear end of the passenger cabin, i.e., a rear seat. Specifically, the passenger cabin may include two front seats 14, i.e., the first seat 14a and the second seat 14b, spaced from each other along the cross-vehicle axis C. The first seat 14a may be referred to as a driver seat, and the second seat 14b may be referred to as a passenger seat.

With continued reference to the FIG. 1, each seat 14 includes a seatback 32 and a seat bottom 34. The seatback 32 may be supported by the seat bottom 34 and may be movable relative to the seat bottom 34. The seatback 32 and the seat bottom 34 may be adjustable in multiple degrees of freedom. Specifically, the seatback 32 and the seat bottom 34 may themselves be adjustable, in other words, adjustable components within the seatback 32 and/or the seat bottom 34 may be adjustable relative to each other.

Each seat 14 includes two sides 36, 38 spaced from each other. The seat 14 may terminate at the sides 36, 38. The sides 36, 38 extend along the seatback 32 and the seat bottom 34. The sides 36, 38 may support an occupant laterally relative to the seat 14. As one example, one of the sides 36, 38 may be an outboard side 36, and the other of the sides 36, 38 may be an inboard side 38 (with "inboard" and "outboard" referring to the relative position of the sides in a cross-vehicle direction). In such an example, the outboard side 36 is between the inboard side 38 of the seat 14 and an adjacent door.

The seat bottom 34 includes a front end 40 and a back end 42. The seatback 32 is at the back end 42. The front end 40 is spaced from the back end 42 and the seatback 32. The seatback 32 extends across the seat bottom 34, e.g., from one side 36 of the seat 14 to the other side 38 of the seat 14, at the back end 42.

The seatback 32 includes a bottom 44 at the seat bottom 34 and a top 46 spaced from the bottom 44 and the seat bottom 34. For example, the top 46 may support a head restraint (not numbered), i.e., be disposed between the head restraint and the seat bottom 34.

Each seat 14 defines a seat-forward direction D1 and a seat-rearward direction D2. The seat-forward direction D1 extends forward relative to the seat 14. For example, the seat-forward direction D1 may extend from a rear of the seat 14 to a front of the seat 14 relative to an occupant of the seat 14, i.e., the occupant of the seat 14 faces in the seat-forward direction D1. The seat-rearward direction D2 extends rearward relative to the seat 14, e.g., from the front of the seat 14 to the rear of the seat 14 relative to the occupant of the seat 14. In other words, the seat-rearward direction D2 extends in an opposite direction than the seat-forward direction D1.

The seat 14 defines an occupant seating area 48. The occupant seating area 48 is the area occupied by an occupant when seated on the seat bottom 34. The occupant seating area 48 is in the seat-forward direction D1 of the seatback 32 and above the seat bottom 34. That is, the seatback 32 faces the occupant seating area 48.

With continued reference to FIG. 1, the seat 14 includes a seat frame 50. The seat frame 50 includes a seatback frame 52 and a seat bottom frame (not shown). A hinge (not numbered) couples the seat bottom frame and the seatback frame 52 together. The hinge permits the seatback frame 52 to pivot relative to the seat bottom frame, as discussed above. The seat frame 50 may include panels and/or may include tubes, beams, etc. The seat frame 50 may be formed of any suitable plastic material, e.g., carbon fiber reinforced plastic (CFRP), glass fiber-reinforced semi-finished thermoplastic composite (organosheet), etc. Alternatively, for example, some or all components of the seat frame 50 may be formed of a suitable metal, e.g., steel or aluminum.

With continued reference to FIG. 1, the seat 14 includes a covering 56 supported on the seat frame 50. The covering 56 may be cloth, leather, faux leather, or any other suitable material. The seat 14 may include padding material between the covering 56 and the seat frame 50. The padding material may be foam or any other suitable material. The cover may be stitched in panels around the seat frame 50 and padding material.

With reference to FIG. 2, the seat 14, e.g., the covering 56, may include a tear seam 58. The tear seam 58 may be disposed on the seatback 32. For example, the tear seam 58 may extend along the inboard side 38 of the seatback 32 adjacent to the airbag 16. Said differently, the airbag 16 may extend through the tear seam 58 in the inflated position. The tear seam 58 may have any suitable shape. For example, the tear seam 58 may have a linear shape, i.e., extending in a line along the seat 14.

The tear seam 58 may be designed to tear apart when subjected to a tensile force above a threshold magnitude. In other words, the covering 56 on one side of the tear seam 58 separates from the covering 56 on the other side of the tear seam 58 when the force is above the threshold magnitude. The threshold magnitude may be chosen to be greater than forces from, e.g., inadvertent pushing against the seat 14 by an occupant but be less than forces from the deployment of the airbag 16. The tear seam 58 may be, for example, a line of perforations through the covering 56, a line of thinner covering material than the rest of the covering 56, etc.

Each seat 14 is supported by the floor 30, as shown in FIG. 1. Each seat 14 may slide relative to the floor 30, e.g., in the seat-forward direction D1 or the seat-rearward direction D2. In such an example, the seat 14 may be supported on a seat track (not shown) to allow the seat 14 to move in the seat-forward direction D1 or the seat-rearward direction D2. The seat 14 may be selectively slidable relative to the seat track. In other words, the occupant may slide the seat 14 along the seat track and may secure the seat 14 to the seat track at selected position. For example, the occupant may actuate a motor (not shown) that moves the seat 14 along the seat track. As another example, each seat 14 may be fixed relative to the floor 30. In this situation, the seat 14 may be immovable relative to the floor 30.

A center console 60 is disposed in the passenger cabin and fixed to the floor 30, as shown in the Figures. The center console 60 may, for example, be disposed between the first and second seats 14a, 14b. The center console 60 may be elongated in a vehicle fore-and-aft direction. In other words, the longest dimension of the center console 60 may be along a vehicle-longitudinal axis. The center console 60 may support vehicle components, e.g., a gear selector, cup holders, a storage bin, etc. The center console 60 may include multiple components, e.g., panels, brackets, etc., subsequently assembled together. Alternatively, the center console 60 may be a unitary construction. The center console 60 may be any suitable type of material, e.g., plastic.

With reference to FIG. 2, the restraint system 12 includes a side airbag assembly 62, which includes the airbag 16, the external tether 26, a housing 64, and an inflator 66. The first seat 14a supports the side airbag assembly 62, and specifically, may support the airbag 16 when the airbag 16 is in the inflated position. The side airbag assembly 62 may be mounted to the first seat 14a, as discussed further below. The restraint system 12 may include any suitable number of side airbag assemblies 62, e.g., one or more.

The housing 64 houses the airbag 16 in the uninflated position, as shown in FIG. 2, and supports the airbag 16 in the inflated position. The airbag 16 may be rolled and/or folded to fit within the housing 64 in the uninflated position. The housing 64 may be of any suitable material, e.g., a rigid polymer, a metal, a composite, or a combination of rigid materials. The housing 64 may, for example, include clips, panels, etc. for attaching the airbag 16 and for attaching the side airbag assembly 62 to the first seat 14a.

As set forth above, the external tether 26 is connected to the top surface 20 of the upper portion 18 and the bottom surface 24 of the lower portion 22. The external tether 26 may, for example, be directly connected, e.g., via stitching, adhesive, ultrasonic welding, etc., to the top surface 20 and/or the bottom surface 24. As another example, the external tether 26 may be connected to the top surface 20 and/or the bottom surface 24 via one or more intermediate components, e.g., upper and/or lower guide loops 70, 72, as discussed below.

The external tether 26 may be uninflatable. In other words, the external tether 26 may not define an inflation chamber, e.g., the external tether 26 may be a panel of material that is not fixed to another panel, or itself, to enclose a volume for receiving inflation medium. The external tether 26 may be a woven fabric, or any other suitable material.

Figure 3A:
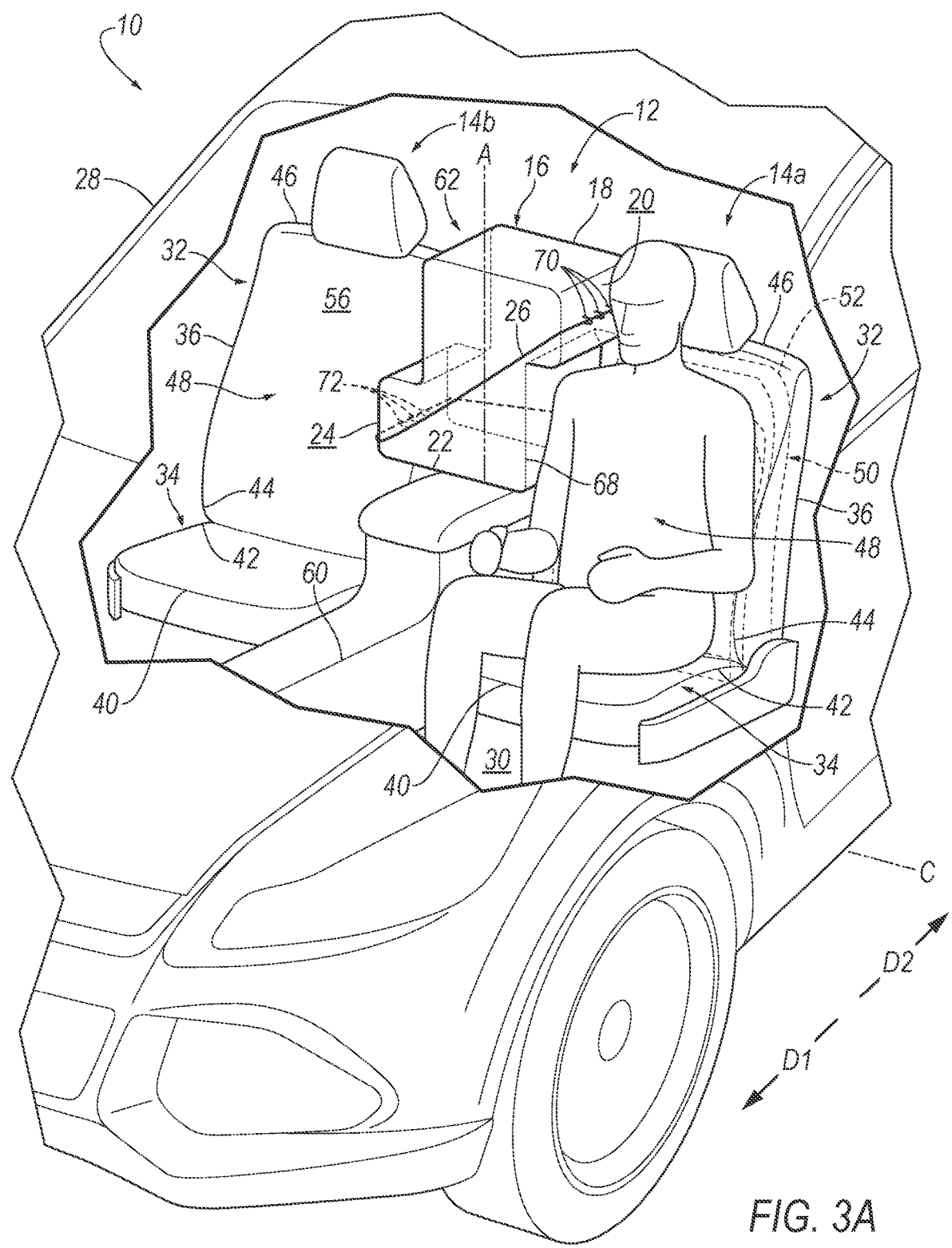
FIG. 3A is a perspective view of the airbag in an inflated position and an external tether in an unreleased position.
Figure 3B:
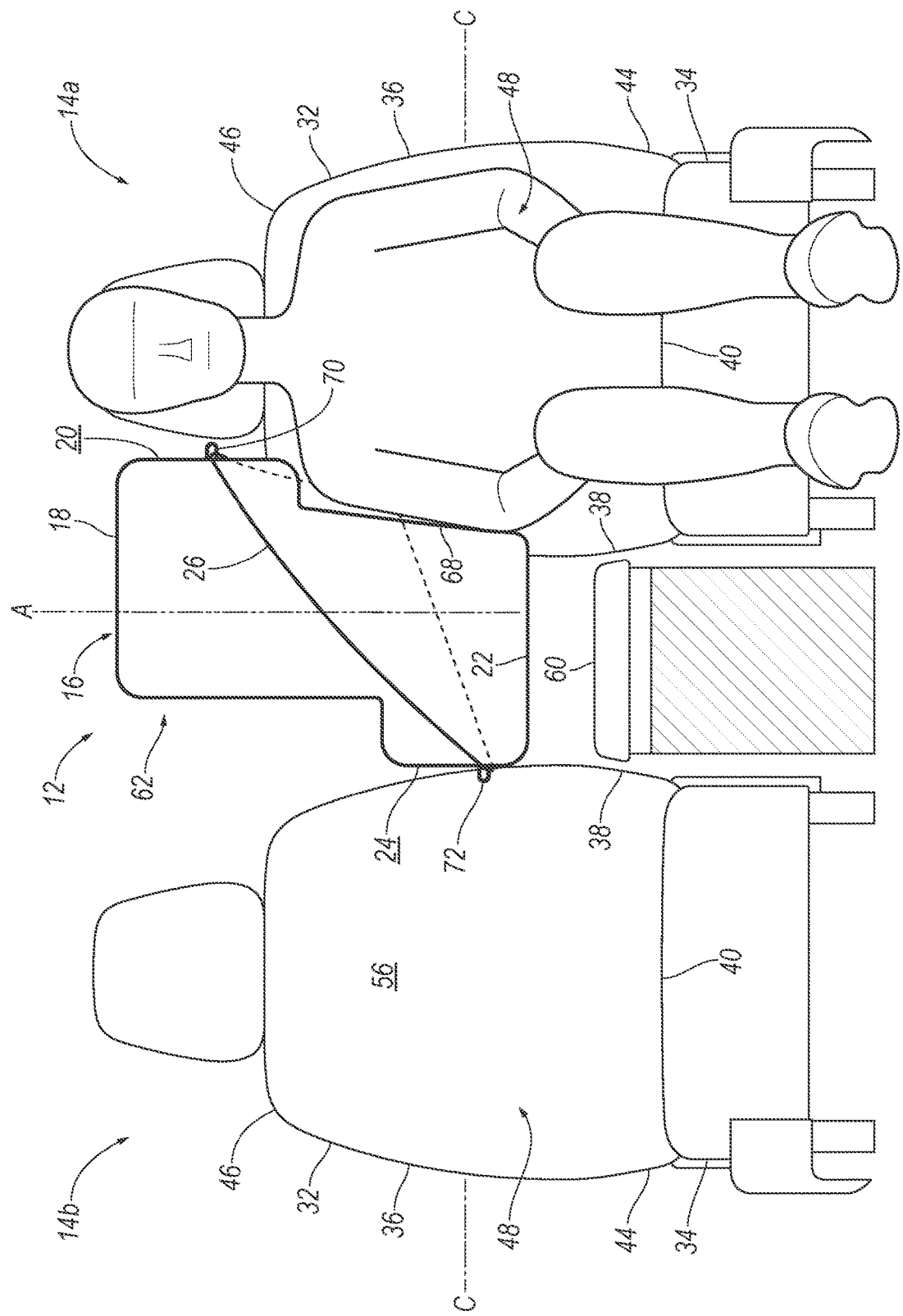
FIG. 3B is a front view of the airbag in the inflated position and the external tether in the unreleased position.
Figure 4A:
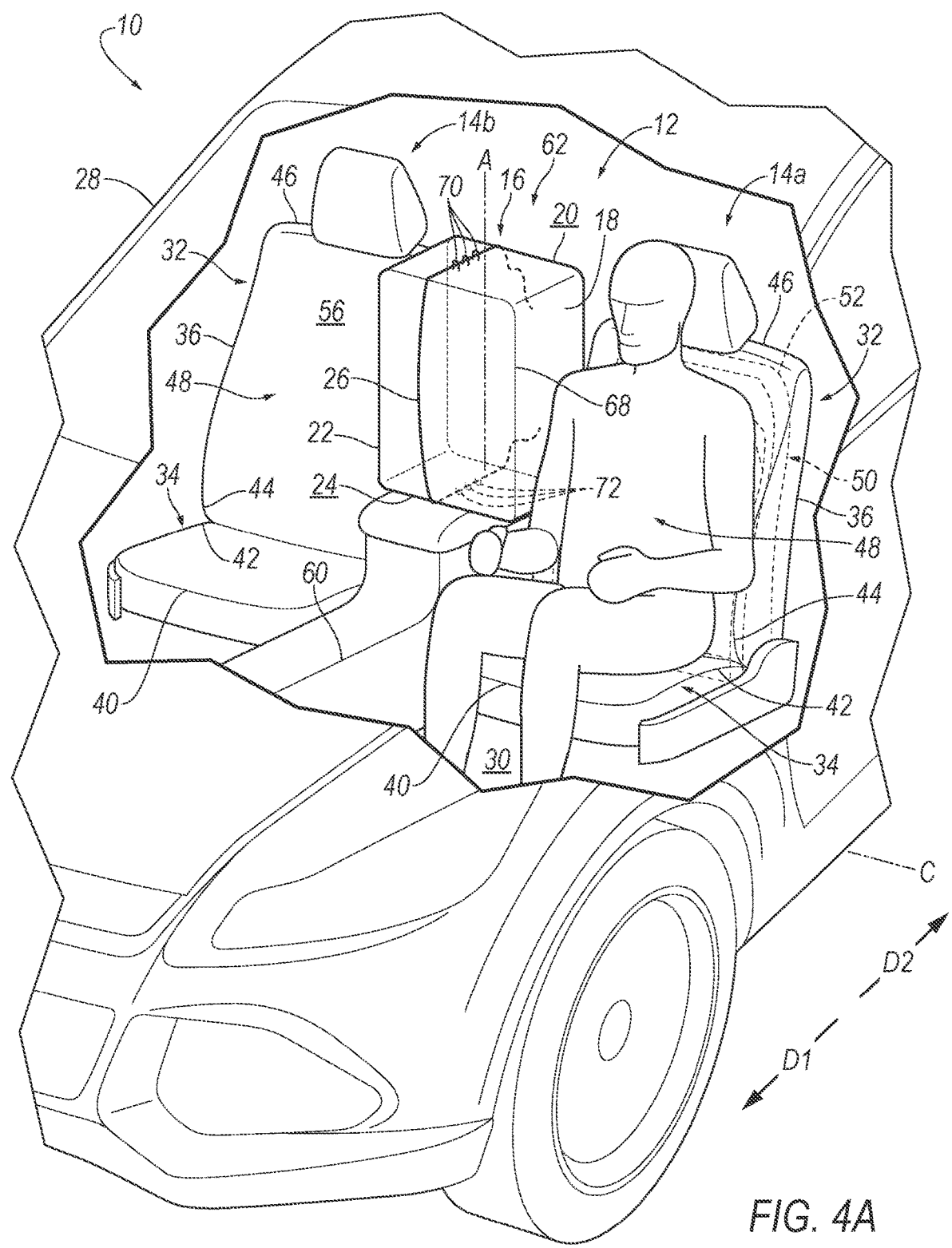
FIG. 4A is a perspective view of the airbag in the inflated position and the external tether in a released position.
Figure 4B:
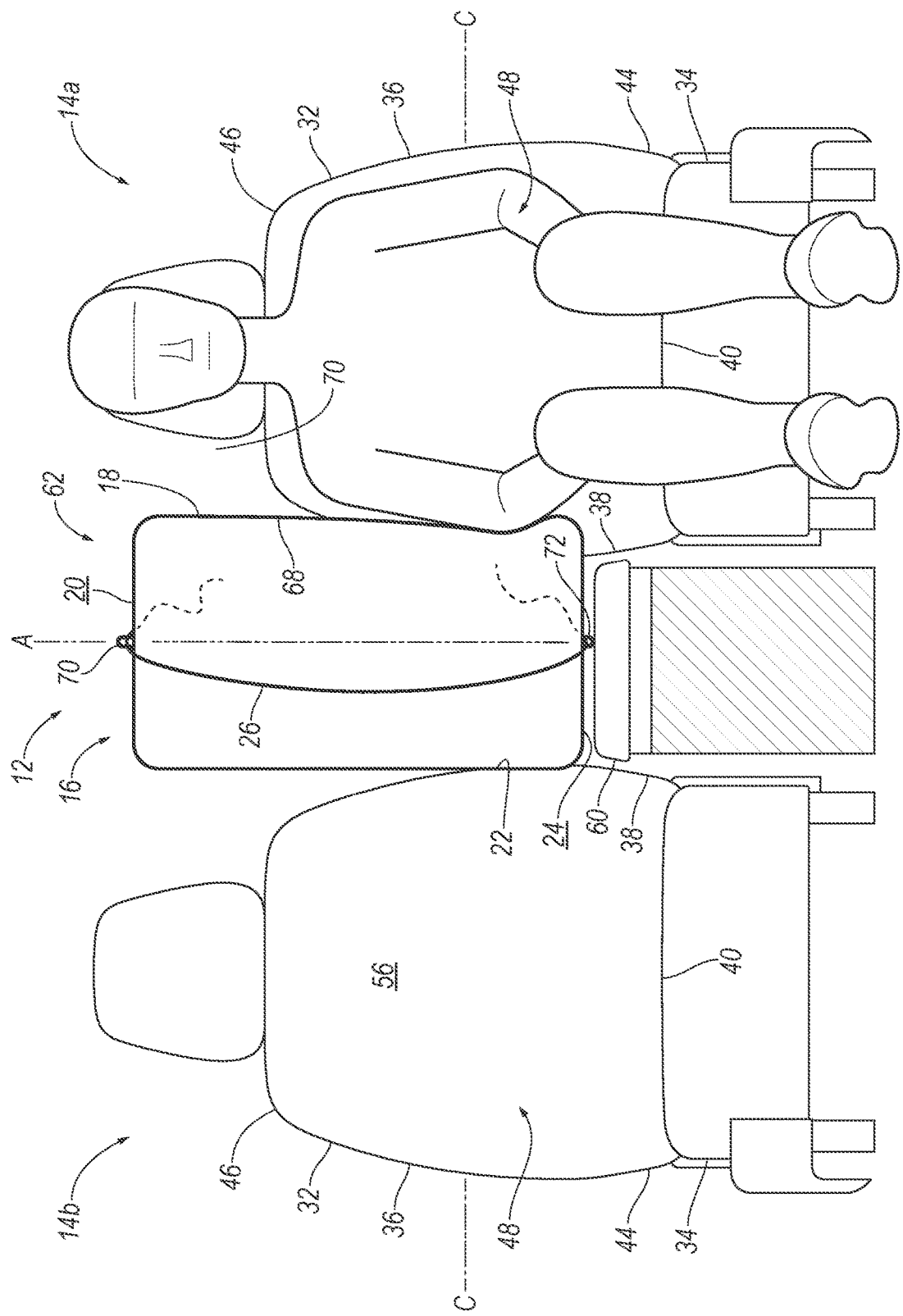
FIG. 4B is a front view of the airbag in the inflated position and the external tether in the released position.

The external tether 26 is selectively releasable from an unreleased position, as shown in FIGS. 2-3B, to a released position, as shown in FIGS. 4A-4B. In the unreleased position, the external tether 26 is engaged with, i.e., coupled to, the first seat 14a. The external tether 26 may be under tension when the external tether 26 is in the unreleased position and the airbag 16 is in the inflated position, as shown in FIGS. 3A and 3B. In other words, the external tether 26 may be taught, i.e., not relaxed, when the external tether 26 is in the unreleased position and the airbag 16 is in the inflated position.

The external tether 26 extends around the airbag 16 when the external tether 26 is in the unreleased position. For example, the external tether 26 may extend about an axis A transverse to the cross-vehicle axis C. That is, the external tether 26 may form a loop and the airbag 16 may be disposed within the loop when the external tether 26 is in the unreleased position. By looping the external tether 26 around the airbag 16, the airbag 16 may press against the external tether 26 in the unreleased position during inflation thereby tensioning the external tether 26, as shown in FIGS. 3A-3B. In this situation, the external tether 26 may assist in controlling the shape the airbag 16 in the inflated position. By controlling the shape of the airbag 16 during inflation, the external tether 26 may assist in positioning the top surface 20 of the upper portion 18 in the occupant seating area 48 of the first seat 14a, which can assist the airbag 16 in controlling kinematics of the occupant in the first seat 14a.

In the released position, the external tether 26 is disengaged with the first seat 14a. The external tether 26 may be relaxed in the released position. That is, at least one end of the external tether 26 may be free, i.e., uncoupled from the first seat 14a, as shown in FIGS. 4A and 4B. In this situation, the external tether 26 may not control the shape of the airbag 16 during inflation. By not controlling the shape of the airbag 16 with the external tether 26 during inflation, the upper portion 18 and the lower portion 22 may be disposed between the first and second seats 14a, 14b in the inflated position, which may increase the likelihood that the airbag 16 provides coverage to control the kinematics of the occupants in either seat 14a, 14b during offset and oblique impacts.

The airbag 16 may be woven nylon yarn, for example, nylon 6-6. Other examples include polyether ether ketone (PEEK), polyetherketoneketone (PEKK), polyester, etc. The woven polymer may include a coating, such as silicone, neoprene, urethane, etc. For example, the coating may be polyorgano siloxane.

The airbag 16 may be a single continuous unit, e.g., a single piece of fabric. Alternatively, the airbag 16 may include a plurality of segments, i.e., two or more. The segments may be attached to each other in any suitable fashion, e.g., a plurality of panels attached by stitching, ultrasonic welding, etc.

The airbag 16 is supported by the seatback 32 of the first seat 14a. For example, the side airbag assembly 62 may be supported by the inboard side 38 of the seatback 32, as shown in the Figures. Specifically, the side airbag assembly 62 may be fixed to the seat frame 50. The airbag 16 may, for example, be disposed in the seatback 32 in the uninflated position, i.e., between the covering 56 and the seat frame 50, as shown in FIG. 1. In other words, the covering 56 may cover the airbag 16 in the uninflated position.

In the inflated position, the airbag 16 may extend through the seatback 32, e.g., the tear seam 58 adjacent to the airbag 16, as shown in FIGS. 3A-4B. In this situation, the airbag 16 may extend outwardly from the seatback 32, e.g., along the cross-vehicle axis C towards the second seat 14b. Additionally, the airbag 16 may extend in the seat-forward direction D1 in the inflated position. In the inflated position, the airbag 16 may extend any suitable amount in the seat-forward direction D1.

In the inflated position, the airbag 16 may extend next to the occupant seating area 48 to control kinematics of the occupant, e.g., of a head. For example, in the inflated position, the airbag 16 may be disposed inboard of the occupant seating area 48. In other words, the airbag 16 may be disposed between the first seat 14a and the second seat 14b, as shown in FIGS. 3A-4B. That is, the airbag 16 may extend into the space between the first and second seats 14a, 14b. In other words, the airbag 16 in the inflated position is disposed above the center console 60. The airbag 16, e.g., the lower portion 22, may be spaced from the center console 60 or may abut the center console 60, e.g., a top.

The airbag 16 may include an intermediate portion 68 extending from the upper portion 18 to the lower portion 22, as shown in FIGS. 2-4B. The intermediate portion 68 may be disposed between the seats 14a, 14b in the inflated position. The intermediate portion 68 may be elongated along the seatback 32. The intermediate portion 68 may be fixed relative to the first seat 14a. For example, the intermediate portion 68 may be fixed to the housing 64, e.g., by stitching, ultrasonic welding, etc. The intermediate portion 68 may be fixed to the housing 64 any suitable distance along the intermediate portion 68. For example, the intermediate portion 68 may be fixed to the housing 64 from the upper portion 18 to the lower portion 22. That is, the intermediate portion 68 may be fixed to the housing 64 along an entire length of the intermediate portion 68. Fixing the intermediate portion 68 to the housing 64 may assist in controlling the shape of the airbag 16 in the inflated position when the external tether 26 is in the unreleased position.

With reference to FIG. 2, in the uninflated position, the upper portion 18 and the lower portion 22 may be on opposite sides of the intermediate portion 68. For example, in the uninflated position, the upper portion 18 and the lower portion 22 may be folded in opposite directions relative to the intermediate portion 68. For example, the upper portion 18 may be folded along a first fold (not numbered) towards the first seat 14a, and the lower portion 22 may be folded along a second fold (not numbered) towards the second seat 14b. That is, the upper portion 18 may be folded downwardly relative to the intermediate portion 68, i.e., towards the lower portion 22, and the lower portion 22 may be folded upwardly relative to the intermediate portion 68, i.e., towards the upper portion 18.

In the uninflated position, the top surface 20 and the bottom surface 24 may be generally aligned with each other along a vertical axis, as shown in FIG. 2. In this context, "generally" means that the top and bottom surfaces 20, 24 may be disposed between the first and second folds when the airbag 16 is in the uninflated position even if the top and bottom surfaces 20, 24 deviate from being aligned along an axis. In the uninflated position, the top surface 20 and the bottom surface 24 may face in opposite directions, e.g., towards each other.

As shown in the Figures, the upper portion 18 of the airbag 16, in the inflated position, may be disposed adjacent to the top 46 of the seatback 32. That is, in the inflated position, the upper portion 18 may be disposed closer to the top 46 of the seatback 32 than to the bottom 44 of the seatback 32. For example, the upper portion 18 may be disposed adjacent to a head of an occupant seated in the first seat 14a.

The upper portion 18 may include an upper guide loop 70. The upper guide loop 70 may be designed, i.e., sized and shaped, to receive the external tether 26. In this example, the external tether 26 extends through the upper guide loop 70. That is, the upper guide loop 70 retains the external tether 26 on the top surface 20 of the upper portion 18. Said differently, the external tether 26 may be connected to the top surface 20 of the upper portion 18 via the upper guide loop 70. The upper guide loop 70 may, for example, be connected to the top surface 20 of the upper portion 18, e.g., via stitching, adhesive, ultrasonic welding, etc. For example, the upper guide loop 70 may be stitched to a seam (not shown) of the airbag 16. Alternatively, the upper guide loop 70 may be integrated into the upper portion 18. That is, the upper guide loop 70 may extend through the upper portion 18 of the airbag 16. Said differently, the upper portion 18 may define the upper guide loop 70. The upper guide loop 70 may be any suitable material. For example, the upper guide loop 70 may be a same material as the airbag 16.

The upper portion 18 can include any suitable number of upper guide loops 70, e.g., one or more. As one example, the upper portion 18 can include a plurality of upper guide loops 70, as shown in the Figures. In such an example, the upper guide loops 70 may be spaced from each other in the seat-forward direction D1 along the top surface 20. The upper guide loops 70 may be spaced from each other by any suitable amount. As another example, the upper portion 18 can include one upper guide loop 70 elongated along the top surface 20 in the seat-forward direction D1.

With continued reference to FIGS. 3A and 3B, the lower portion 22 in the inflated position may be disposed between the upper portion 18 and the center console 60. For example, in the inflated position, the lower portion 22 may be disposed adjacent to the bottom 44 of the seatback 32. That is, in the inflated position, the lower portion 22 may be disposed closer to the bottom 44 of the seatback 32 than to the top 46 of the seatback 32.

The lower portion 22 may include a lower guide loop 72, e.g., substantially identical to the upper guide loop 70. The lower guide loop 72 may be designed, i.e., sized and shaped, to receive the external tether 26. In this example, the external tether 26 extends through the lower guide loop 72. That is, the lower guide loop 72 retains the external tether 26 on the bottom surface 24 of the lower portion 22. Said differently, the external tether 26 may be connected to the bottom surface 24 of the lower portion 22 via the lower guide loop 72. The lower guide loop 72 may, for example, be connected to the bottom surface 24 of the lower portion 22, e.g., via stitching, adhesive, ultrasonic welding, etc. For example, the lower guide loop 72 may be stitched to a seam (not shown) of the airbag 16. Alternatively, the lower guide loop 72 may be integrated into the lower portion 22. That is, the lower guide loop 72 may extend through the lower portion 22 of the airbag 16. Said differently, the lower portion 22 may define the lower guide loop 72. The lower guide loop 72 may be any suitable material. For example, the lower guide loop 72 may be a same material as the airbag 16.

The lower portion 22 can include any suitable number of lower guide loops 72, e.g., one or more. As one example, the lower portion 22 can include a plurality of lower guide loops 72. In such an example, the lower guide loops 72 may be spaced from each other in the seat-forward direction D1 along the bottom surface 24. The lower guide loops 72 may be spaced from each other by any suitable amount. As another example, the lower portion 22 can include one lower guide loop 72 elongated along the bottom surface 24 in the seat-forward direction.

With reference to FIGS. 3A and 3B, when the external tether 26 is in the unreleased position, the airbag 16 in the inflated position may have a backwards "Z" shape. That is, when the external tether 26 is in the unreleased position, the upper portion 18, e.g., the top surface 20, and the lower portion 22, e.g., the bottom surface 24, in the inflated position may be offset relative to the cross-vehicle axis C. Said differently, the upper portion 18, e.g., the top surface 20, and the lower portion 22, e.g., the bottom surface 24, may be disposed on opposite sides of the intermediate portion 68 in the inflated position when the external tether 26 is in the unreleased position.

In the inflated position, the top and bottom surfaces 20, 24 may face away from each other. The top surface 20 in the inflated position may face the first seat 14a when the external tether 26 is in the unreleased position. Said differently, the top surface 20 in the inflated position may face an intended occupant of the first seat 14a when the external tether 26 is in the unreleased position. The top surface 20 in the inflated position may be disposed in the occupant seating area 48 when the external tether 26 is in the unreleased position. That is, in the inflated position, the upper portion 18 may extend across the inboard side 38 of the first seat 14a towards the outboard side 36, i.e., the occupant. The bottom surface 24 in the inflated position may face the second seat 14b when the external tether 26 is in the unreleased position. For example, the bottom surface 24 in the inflated position may abut the inboard side 38 of the second seat 14b. That is, the lower portion 22 may extend to the second seat 14b in the inflated position when the external tether 26 is in the unreleased position. As another example, the bottom surface 24 in the inflated position may be between the seats 14a, 14b.

With reference to FIGS. 4A-4B, when the external tether 26 is in the released position, the airbag 16 in the inflated position may have a rectangular shape. In this situation, the top surface 20 and the bottom surface 24 in the inflated position may be disposed next to the occupant seating area 48, i.e., between the seats 14a, 14b. In this situation, the top surface 20 in the inflated position may face the roof of the vehicle 10, and the bottom surface 24 in the inflated position may face the center console 60. For example, the upper portion 18, e.g., the top surface 20, and the lower portion 22, e.g., the bottom surface 24, may be generally aligned with each other along the cross-vehicle axis C. In this context, "generally" means that the upper portion 18 and the lower portion 22 are both disposed between the seats 14a, 14b even if the top and bottom surfaces 20, 24 deviate from being aligned along an axis.

With reference to FIG. 2, a release mechanism 74, 76 may be supported by the seatback 32 of the first seat 14a. For example, the release mechanism 74, 76 may be mounted to the housing 64, e.g., via fasteners, welding, adhesive, etc. As another example, the release mechanism 74, 76 may be mounted to the seat frame 50 of the first seat 14a, e.g., via fasteners, welding, adhesive, etc. The release mechanism 74, 76 may be positioned to release the external tether 26. "Release" means that the external tether 26 becomes uncoupled from the first seat 14a. For example, the external tether 26 may be freed, detached, severed, etc. The release mechanism 74, 76 may be of any suitable type; examples of the release mechanism 74, 76 are in in FIGS. 5 and 6.

Figure 5:
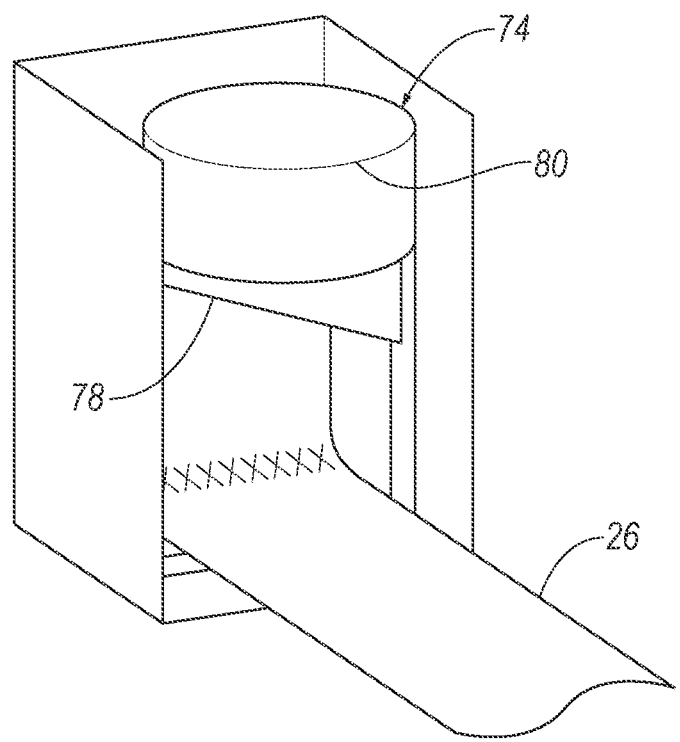
FIG. 5 is a perspective view of a cutter and the external tether.

With reference to FIG. 5, for example, the release mechanism 74, 76 may be a cutter 74 positioned to sever the external tether 26. The cutter 74 may have a sharp edge 78 directed at the external tether 26, and a mechanism such as a firing pin 80 for driving the sharp edge 78 toward the external tether 26. The sharp edge 78 of the cutter 74 may be sharp enough to slice the external tether 26.

Figure 6:
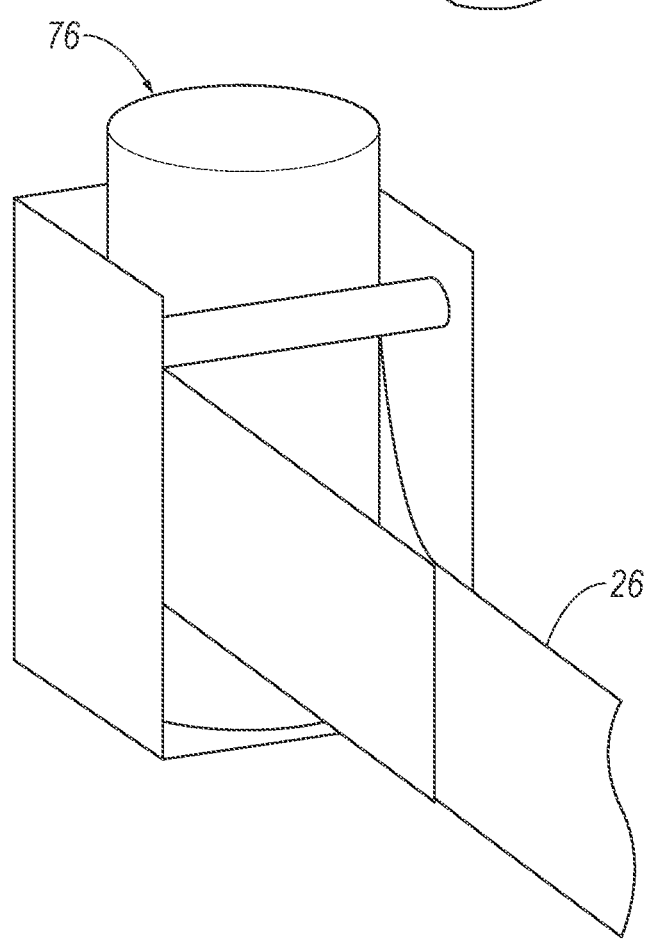
FIG. 6 is a perspective view of a release pin and the external tether.

With reference to FIG. 6, for another example, the release mechanism 74, 76 may be a release pin 76 coupling the external tether 26 to the housing 64. The external tether 26 may have the loop extending around the release pin 76. When the release pin 76 discharges, the release pin 76 jettisons out of the loop and no longer holds the external tether 26.

The inflator 66 is in fluid communication with the airbag 16. The inflator expands the airbag 16 with inflation medium, such as a gas, to move the airbag 16 from the uninflated positions to the inflated positions. The inflator 66 may be supported by the housing 64, as shown in the Figures, or any other suitable component in the vehicle 10, e.g., the seatback 32 of the first seat 14a. The inflator 66 may be, for example, a pyrotechnic inflator that ignites a chemical reaction to generate the inflation medium, a stored gas inflator that releases (e.g., by a pyrotechnic valve) stored gas as the inflation medium, or a hybrid. The inflator 66 may be, for example, at least partially in the inflation chamber to deliver inflation medium directly to the inflation chamber or may be connected to the inflation chamber through fill tubes, diffusers, etc.

Figure 7:
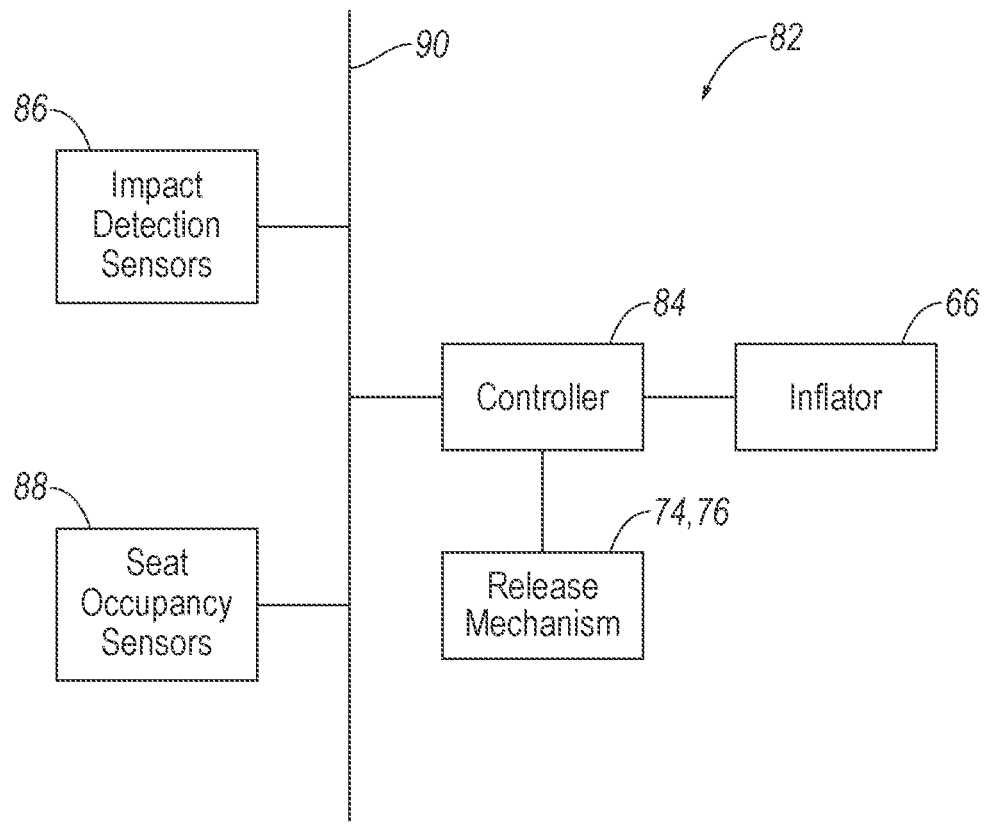
FIG. 7 is a block diagram of a control system of a vehicle.

With reference to FIG. 7, the vehicle 10 may include a control system 82. The control system 82 may include the controller 84, an impact sensor 86, an occupancy sensor 88, and the side airbag assembly 62, e.g., the inflator 66, in communication through a communication network 90.

The impact sensor 86 may be in communication with the controller 84. The impact sensor 86 is programmed to detect an impact to the vehicle 10. The impact sensor 86 may be of any suitable type, for example, post-contact sensors such as accelerometers, pressure sensors, and contact switches; and pre-impact sensors such as radar, lidar, and vision-sensing systems. The vision systems may include one or more cameras, CCD image sensors, CMOS image sensors, etc. The impact sensor 86 may be located at numerous points in or on the vehicle 10.

The control system 82 includes occupancy sensors 88 for the first and second seats 14a, 14b. The occupancy sensors 88 may be configured to detect occupancy of each the seat 14. The occupancy sensor 88 may be visible-light or infrared cameras directed at the seat 14, weight sensors inside the seat 14, sensors detecting whether a seatbelt (not shown) for the seat 14 is buckled or unspooled, or other suitable sensors. The occupancy sensor 88 is in communication with the controller 84 via the communications network.

The controller 84 may be a microprocessor-based computing device implemented via circuits, chips, or other electronic components. The controller 84 may include a processor, memory, etc. The memory of the controller 84 may store instructions executable by the processor and the processor may read the instructions from the memory and execute the instructions.

The control system 82 may transmit signals through the communications network 90 such as a controller area network (CAN) bus, Ethernet, Local Interconnect Network (LIN), and/or by any other wired or wireless communications network.

The controller 84 may be programmed to selectively release the external tether 26 in response to a detection of the first and second seats 14a, 14b being occupied. Specifically, the controller 84 may be programmed to receive a notification that the seats 14a, 14b are occupied and instruct the release mechanism 74, 76 to release the external tether 26 in response to the vehicle impact if the occupancy sensors 88 detect that both seats 14a, 14b are occupied. In this situation, the external tether 26 is released, i.e., in the released position, during inflation of the airbag 16.

The controller 84 may be programmed to prevent releasing the external tether 26 in response to a detection of the second seat 14b being unoccupied. Specifically, the controller 84 may be programmed to receive a notification that the second seat 14b is unoccupied. The controller 84 may, for example, then send a signal to prevent release of the external tether 26. Alternatively, the controller 84 may not send a signal to the release mechanism 74, 76 upon detecting no occupant in the second seat 14b. In this situation, the external tether 26 is not released, i.e., remains in the unreleased position, during inflation of the airbag 16.

Computing devices, such as the computer, generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper internal and fiber optics, including the internals that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In operation, the airbag 16 is in the uninflated position, under normal operating conditions of the vehicle 10. In the event of a vehicle impact, the impact detection sensors 86 detect the impact. Additionally, the occupancy sensors 88 detect the occupancy of each seat 14a, 14b. The impact detection sensors 86 transmit a signal indicating the vehicle impact collision through the communication network 90 to the controller 84. Additionally, the occupancy sensors 88 transmit a signal indicating the occupancy of the seats 14a, 14b through the communication network 90 to the controller 84. When the vehicle impact is detected, the controller 84 transmits a signal through the communication network 90 triggering the inflator 66 to inflate the airbag 16 with inflation medium from the uninflated position to the inflated position. When the inflator 66 inflates the airbag 16 to the inflated position, the inflation medium flows into the airbag 16, increasing the pressure in the airbag 16. As the pressure is increased in the airbag 16, the airbag 16 inflates outwardly from the seatback 32. When the second seat 14b is unoccupied, the controller 84 can send a signal through the communications network 90 preventing the release mechanism 74, 76 from releasing the external tether 26, which allows the external tether 26 to control the shape of the airbag 16 in the inflated position. As the occupant moves relative to the first seat 14a due to momentum of the vehicle impact, the occupant moves towards the airbag 16. When the occupant impacts the airbag 16, the airbag 16 controls the kinematics of the occupant during an offset or oblique vehicle impact.

When both seats 14a, 14b are occupied, the controller 84 can send a signal through the communications network 90 triggering the release mechanism 74, 76 to release the external tether 26, which allows the upper portion 18 and the lower portion 22 to be disposed between the seats 14a, 14b in the inflated position. By releasing the external tether 26, the airbag 16 can control the kinematics of the occupant in either the seat 14a, 14b during an offset or oblique vehicle impact.

The disclosure has been described in an illustrative manner, and it is to be understood that the terminology which has been used is intended to be in the nature of words of description rather than of limitation. The adjectives "first" and "second" are used throughout this document as identifiers and are not intended to signify importance or order. Many modifications and variations of the present disclosure are possible in light of the above teachings, and the disclosure may be practiced otherwise than as specifically described.

What is claimed is:

1. A restraint system, comprising:
   a first seat and a second seat spaced from each other along a cross-vehicle axis;
   an airbag supported by the first seat and inflatable towards the second seat;
   the airbag including an upper portion having a top surface and a lower portion having a bottom surface facing in an opposite direction than the top surface; and
   an external tether releasably engaged with the first seat, the external tether being connected to the top surface and the bottom surface.

2. The restraint system of claim 1, wherein the airbag includes an intermediate portion extending from the upper portion to the lower portion, the intermediate portion being fixed relative to the first seat.

3. The restraint system of claim 2, further comprising an airbag housing fixed to the first seat, the intermediate portion being fixed to the airbag housing from the lower portion to the upper portion.

4. The restraint system of claim 3, further comprising an inflator in fluid communication with the airbag, wherein the inflator is supported by the airbag housing.

5. The restraint system of claim 3, further comprising a release mechanism configured to release the external tether, wherein the release mechanism is supported by the airbag housing.

6. The restraint system of claim 2, wherein the upper portion and the lower portion, in the inflated position, are on opposite sides of the intermediate portion when the external tether is in an unreleased position.

7. The restraint system of claim 1, wherein the first seat defines an occupant seating area, the upper portion, in an inflated position, extending into the occupant seating area when the external tether is in an unreleased position.

8. The restraint system of claim 1, wherein the lower portion, in an inflated position, extends to the second seat when the external tether is in an unreleased position.

9. The restraint system of claim 1, wherein the upper and lower portions, in the inflated position, are offset with each other relative to the cross-vehicle axis when the external tether is in an unreleased position.

10. The restraint system of claim 1, wherein the upper and lower portions, in the inflated position, are generally aligned with each other relative to the cross-vehicle axis when the external tether is in a released position.

11. The restraint system of claim 1, further comprising a center console disposed between the first and second seats, wherein the lower portion in the inflated position is disposed between the center console and the upper portion.

12. The restraint system of claim 1, wherein the external tether extends around the airbag when the external tether is in an unreleased position.

13. The restraint system of claim 1, wherein the external tether extends about an axis transverse to the cross-vehicle axis when the external tether is in an unreleased position.

14. The restraint system of claim 1, further comprising a release mechanism supported by the first seat, wherein the release mechanism is a cutter configured to release the external tether.

15. The restraint system of claim 1, further comprising a release mechanism supported by the first seat, wherein the release mechanism is a release pin configured to release the external tether.

16. The restraint system of claim 1, wherein the external tether is under tension when the external tether is in an unreleased position and the airbag is in the inflated position.

17. The restraint system of claim 1, wherein the external tether is fabric.

18. The restraint system of claim 1, wherein the external tether is uninflatable.

19. The restraint system of claim 1, further comprising a computer including a processor and a memory, the memory storing instructions executable by the processor to release the external tether based on detecting that the first and second seats are occupied.

20. The restraint system of claim 19, wherein the instructions further include instructions to prevent releasing the external tether based on detecting that the second seat is unoccupied.

* * * * *